United States Patent Office 3,422,053
Patented Jan. 14, 1969

3,422,053
PAVING COMPOSITIONS
Albert J. Henderson, Coraopolis, James R. Patterson, Carnegie, and Raymond A. Hahn, Pittsburgh, Pa., assignors to Neville Chemical Company, Pittsburgh, Pa., a corporation of Pennsylvania
No Drawing. Filed Oct. 5, 1964, Ser. No. 401,682
U.S. Cl. 260—33.6      4 Claims
Int. Cl. C08f 31/04; E01c 7/26

---

ABSTRACT OF THE DISCLOSURE

A light colored, synthetic resinous binder useful in paving compositions comprises a polymeric hydrocarbon resin which is substantially free of components boiling below about 400° C., has an iodine number between about 50 and 90 mgs. and a Ring and Ball softening point between about 40° and about 250° C., said resin comprising between about 10% and about 35% polymerized cyclopentadiene units and at least about 50% polymerized unsaturated $C_8$–$C_{10}$ aromatic hydrocarbons based on total resin. An inert mineral oil may be included in the composition as needed to impart to the total binder composition a softening point of between about 40° and 120° C. and a penetration value between about 60 and 300. Because of its particular chemical composition, the binder can be maintained in a melted condition over extended periods without gelation, remains fluid at temperatures below about 325° F. and yet is capable of producing satisfactory heat resistant and oil resistant, light-colored pavements. By including a suitable pigment in the composition an attractively colored pavement can be produced for paving areas such as driveways or for color-coding complex highway interchanges, etc.

---

This invention relates to an improved synthetic resinous binder for mineral aggregate and to bituminous-type paving compositions made therewith. More particularly, it relates to a novel thermoplastic binder composition that can be maintained in a melted condition over extended periods without deterioration and that remains fluid at temperatures below about 325° F. and yet produces satisfactorily heat resistant and oil resistant light colored pavements. Still more particularly it relates to compositions of the aforementioned type which contain (1) a thermoplastic hydrocarbon resin possessing a specific gravity greater than 1.00 and a certain moderate amount of polymerized dicyclopentadiene structures; (2) a sufficient amount of a suitable plasticizing oil to result in a penetration value of between about 60 and 100 (ASTM D–5); and also, preferably, (3) a small amount of natural or synthetic rubber.

Background and objects of invention

In recent years there has been an increasing demand for improved paving compositions of the bituminous type capable of being handled like asphalt but superior thereto in respect of color and solvent resistance. This need has been partially met in the prior art by the replacement of asphalt with binders based on various thermoplastic acyclic polymers such as polyethylene, polypropylene, polyvinyl chloride, certain steam cracked hydrocarbon resins having an average molecular weight of at least 1000, specific gravity (25/25° C.) of less than 1 and an essentially acyclic polymer structure, as well as various combinations of the aforementioned materials. The further inclusion of minor amounts of lower molecular weight plasticizers such as mineral oils or various low molecular weight resins in such binders has also been heretofore suggested, e.g., in U.S. Patent No. 3,070,570, thereby to permit the use of polymers that by themselves had an excessively high softening point.

The heretofore available pavement binders based on these synthetic polymers have generally been characterized by softening points higher than about 150° F. (65° C.), and by penetration values of about 25 or less. Still other types of solid or semi-solid hydrocarbon resins have also been heretofore suggested as binders for bituminous-type pavements but never appear to have attained significant commercial use because of their various practical shortcomings. Even the seemingly more promising prior art binders, such as those based principally on unblended high molecular weight polymers such as polyethylene or on the high melting steam cracked acyclic hydrocarbon resins have presented serious practical difficulties.

In particular, the very high softening temperatures of these binders have created problems because the paving trade has been used to working with a considerably lower melting material, i.e., regular asphalt. For instance, in a number of instances cements formulated with the high melting binders solidified in the trucks in which they were being transported from the mixing site to the job site when the trucks encountered unexpected delays en route. In other instances, the use of binders based on lower melting polymers resulted in road surfaces that became objectionably soft in hot weather. In still other instances, polymeric binders derived from cracked petroleum fractions that contained relatively high amounts of polymeric cyclodiene structures have been known to undergo a most undesirable premature increase in viscosity and eventually gelation when stored for extended periods in melted form at elevated temperatures in the presence of air prior to final use. It is perhaps for this reason that there appear repeated suggestions in the prior art to the effect that the normally present cyclodienes be rigorously excluded from cracked polymerization feeds when the polymerization product is intended for service as a bituminous type binder. It should be kept in mind that in the paving art the binder must often be delivered to a paving contractor's base location in liquid form and stored there at temperatures in excess of 200° F. for a week or more until it is finally mixed with aggregate and used in laying down a pavement.

It is an object of this invention to provide binders for pavements which are based on relatively inexpensive hydrocarbon resins but nevertheless produce superior pavements light in color, capable of being pigmented, and convenient to handle by techniques conventional in the asphalt paving art. Another object is to provide a light colored synthetic resinous binder which has a softening point similar to that of ordinary asphalt and which can be kept at elevated temperatures in the presence of air over extended periods without undergoing objectionable changes in viscosity. Still another object is to provide a binder in a form that does not require storage as a melt at elevated temperatures but which, if desired, can be stored at ambient temperature in standard packaging containers and then conveniently converted to a good binder in the field by being added in solid or flake form together with the proper amount of a liquid plasticizer oil to hot mineral aggregate in a pug mill or the like and thereby melted upon mixing. These and other objects as well as the nature, mode of operation and scope of the

Description of invention

It has now been discovered that an unusually effective binder useful in the manufacture of light colored bituminous-type pavements can be formulated by mixing certain relatively inexpensive hydrocarbon resins having a substantial content of cyclic molecular structures, as reflected by a specific gravity at 25/25° C. of at least about 1.04, with a plasticizing amount of a high boiling, substantially inert petroleum hydrocarbon oil, and preferably also with a small amount of a rubbery polymer or particularly of a diene hydrocarbon elastomer such as SBR synthetic rubber or natural rubber.

The novel binders are particularly suitable for use as a bituminous-type cement in the preparation of "hot mix asphaltic concrete." In such use, the binder is preheated to about 135–155° C. to convert it into a liquid of suitable low viscosity, whereupon it is pumped into a pug mill loaded with preheated mineral aggregate, e.g., aggregate that has been preheated to about 160 to 185° C., preferably about 175° C., all in a manner otherwise conventional in the asphalt cement art. Higher temperatures than those indicated are considered objectionable because of possible harm in overheating the equipment, fire hazard, objectionable fumes, degradation of binder or pigment, etc. The binder and aggregate are then mixed at about 150° C. and the resulting hot mix concrete spread on the road bed to the proper thickness using an aggregate spreader or an asphalt paver, and rolled with a roller in the same manner as an ordinary black petroleum asphalt paving composition.

Alternately, the novel binder may be used as a substitute for asphalt in any of the following types of compositions; asphalt cement, rapid curing liquid asphalt, medium curing liquid asphalt, slow curing liquid asphalt and aqueous asphalt emulsions.

As understood herein, a bituminous-type cement is asphalt or an asphalt-like resin that is refined to meet accepted specifications for paving purposes. Thus, such cements should have a penetration value between 40 and 300 (ASTM D–5) and should be at least 99.5% soluble in carbon tetrachloride.

Various grades of asphalt cement are used for making hot mix asphalt-type concrete. The four grades adopted by the Asphalt Institute, viz 60–70, 85–100, 120–150 and 200–300 as well as 40–50 which is used for special applications or for road paving in hot climates can all be produced by using suitable embodiments of the present invention. A variation of approximately 20° C. in the softening point of the binder employed in the invention may be sufficient to cover the above difference in penetration of from 40–50 up to 200–300 range. Any of these cement grades can thus be obtained by a proper selection or slight modification of any one or more of the ingredients employed in the present invention so as to obtain the desired binder softening point. For example, the desired result can be obained by suitable choice of the resin type or by a particular soft point level of the hydrocarbon resin chosen, or by proper choice of the relative amounts of hydrocarbon resin and plasticizer oil used, or further by variation in the degree of steaming employed in the preparation of the binder to remove some of its more volatile constituents. In short, the equivalent of the above five grades of asphalt cement can be made in accordance with the present invention by selection of any of the foregoing means or of other means which suitably affect the binder softening point.

The aggregates used in making paving compositions in accordance with this invention are mineral aggregates of conventional compositions. When a thick, heavy duty pavement is to be laid down, e.g., a layer about ½ inch to 3 inches thick, a suitable aggregate may comprise a mixture of, for instance, 100 parts of coarse aggregate such as crushed gravel or rock, 80 parts of fine aggregate or sand and about 5 parts of mineral dust, all according to well known criteria used to formulate mixtures that meet specified gradation requirements. On the other hand, when, for instance, the paving composition is to be used only as a thin overlay for resurfacing a deteriorated old pavement or to provide a surface of desired color on top of a proper bed or paved underlayer, the binder may be mixed with sand only. The ratio of binder to mineral aggregate may also be varied over a wide range according to well known criteria depending on particle size distribution of the aggregate, viscosity and melting point of the binder, end use to which the pavement is to be put, etc. Typically about 4 to 15 parts, and preferably about 6 to 10 parts of binder per 100 parts of aggregate may be used.

The coarse aggregate may be crushed limestone, crushed gravel, quartz, water quenched slag, or sea shells. All aggregate retained on No. 8 sieve (ASTM C–136) is considered coarse aggregate. However, the coarse aggregate used generally ranges in size from ⅛ inch to ½ inch. The fine aggregates may similarly be crushed limestone, crushed gravel, quartz, crushed sea shells, crushed sandstone, or sand ranging in size from that retained on No. 200 sieve and including all material passing the No. 8 sieve. Generally, the fine aggregate used ranges from about 0.004 inch to ⅛ inch. The mineral filler may be pulverized limestone, silica, hydrated lime, pulverized slag or portland cement. By official particle size definition at least 65% of the mineral filler should pass the No. 200 sieve. When a powdered solid pigment is used in the paving composition it should be considered as part of the mineral filler. Naturally, when it is desired to make pavements which are light in color or brightly pigmented a light colored mineral aggregate should be used.

The essential ingredient of the novel binder composition is a synthetic hydrocarbon resin meeting the specifications set forth below. In particular, it is essential that the synthetic hydrocarbon resin contain a substantial amount of polymerized aromatics as well as a substantial but limited amount of polymerized cyclodienes. Suitable resins are prepared by Friedel-Crafts polymerization of an unsaturated normally liquid hydrocarbon feed fraction boiling between about 100° and about 275° C., preferably having not more than about 5% of material boiling below 150° C. and not more than about 5% boiling above 235° C., obtained by high temperature and low pressure non-catalytic cracking of normally liquid or gaseous hydrocarbons having 2 or more carbon atoms per molecule, e.g., by cracking natural gas or straight run or catalytic cracked naphthas or gas oils. Such non-catalytic cracking may be carried out with or without the addition of steam to the process, but feeds obtained from steam cracking processes are particularly desirable. The polymerization feed fractions useful in the preparation of the resins required herein may be by-products or non-catalytic cracking processes operated principally for the production of low boiling olefins and dienes such as ethylene, propylene, butenes, butadiene, isoprene, etc.

More preferably, the cracked hydrocarbon fractions suitable as resin polymerization feeds herein boil within the range between about 145° and 250° C. and contain at least 35%, e.g., 50 to 90%, of polymerizable $C_9$ and $C_{12}$ hydrocarbons, principally $C_9$ and $C_{10}$ hydrocarbons, such as between about 5 and up to about 30% cyclodiene dimers such as dicyclopentadiene and dimethylcyclopentadiene and co-dimer of cyclopentadiene and methylcyclopentadiene, about 5 to 20% indene and methylindene, about 5 to 25% vinyl toluene, and 0 to about 10% other styrenes, the balance being constituted of essentially unpolymerizable paraffins, naphthenes and particularly essentially unpolymerizable aromatics containing 9 or more carbon atoms per molecule such as trimethylbenzenes, ethyltoluene, tetramethylbenzenes and naphthalene which boil within the aforementioned range. When such a cracked fraction contains more than about 55% of polymerizable hydrocarbons it is usually diluted with a substantially unpolymerizable hydrocarbon diluent prior to polymerization. The finished resin, after stripping off enough of the unpolymerized feed components to obtain a resin of the proper softening point, desirably contains about 10 to 35% combined cyclopentadiene units, about 25 to 60% combined vinyl aromatics (e.g., 25 to 40% combined vinyl toluene and 0 to 20% other combined styrenes), and about 20 to 45% combined indene and methylindene based on total polymer.

Particularly desirable resins are obtained from unsaturated hydrocarbon fractions boiling in the kerosene range between about 150° and about 225° C., and having a specific gravity (15.6/15.6° C.) between about 0.90 and 0.95 and containing at least about 50% and preferably 60 to 70% of ethylenically unsaturated polymerizable constituents, i.e., giving a yield of about 60 to 70% (on diluent-free basis) of polymeric resin upon polymerization. A typical such feed fraction is more fully described in Tables I-A and I-B.

TABLE I-A.—INSPECTION OF TYPICAL POLYMERIZATION FEED FRACTION

| Property: | Result |
|---|---|
| Sp. Gr. at 15.6/15.6° C. | 0.936 |
| Gardner Color | 8 |
| Mixed Aniline Point, ° C. (ASTM) | 14.4 |
| Lighter than $C_8$, percent | 0.88 |
| ASTM Dist., ° C. corrected: | |
| IBP | 160 |
| 10% (vol.) | 165 |
| 50% (vol.) | 176 |
| 90% (vol.) | 193 |
| EP | 209 |
| Recovery, percent | 98.5 |

TABLE I-B.— TYPICAL APPROXIMATE COMPOSITION OF POLYMERIZATION FEED FRACTION

| | Wt. percent |
|---|---|
| "Saturated" aromatics | |
| Xylenes and ethylbenzene | 1–2 |
| Trimethylbenzenes and n-propylbenzene | 12–14 |
| Tetramethylbenzenes | 1–6 |
| Naphthalene | 3–10 |
| Ethyltoluene | 2–5 |
| Hydrindene | 0–4 |
| Pentamethylbenzene | 0–2 |
| Typical total "saturated" aromatics | 25–40 |
| "Olefinic" aromatics | |
| Vinyl toluene | 19–25 |
| Indene | 10–20 |
| Methylindene | 3–8 |
| Styrene | 0–3 |
| α-Methylstyrene | 0–3 |
| Ethylstyrene | 0–2 |
| Allylbenzene | 0–2 |
| Dimethylindene | 0–2 |
| Dimethylstyrene | 0–5 |
| Divinylbenzene | 0–2 |
| Typical total "olefinic" aromatics | 35–45 |
| Diolefinic cyclics | |
| Dicyclopentadiene (DCPD) | 10–20 |
| Methyldicyclopentadiene | 3–8 |
| Isoprene-CPD Codimer | 0–4 |
| Dimethyldicyclopentadiene | <1–1 |
| Typical total diolefinic cyclics | 10–30 |
| Typical total "olefinic" compounds | 60–75 |

The polymerization feed fractions described above are converted into the desired resins in an otherwise known manner using a Friedel-Crafts metal halide catalyst such as aluminum chloride or bromide or particularly boron trifluoride, or with the well known complexes formed by any of these halides with ethers, alcohols, water, etc. Catalyst residues are removed from the polymerized oil by treating the latter at a suitable temperature, e.g., between 20° and 110° C., with an alkaline material such as aqueous sodium hydroxide or with an adsorbent such as clay or with a combination of several such treating agents. Finally, the polymerized product is usually distilled under vacuum or with steam so as to separate the desired resins from unreacted components of the feed stock.

Polymerization can thus be carried out, for instance, at a temperature between about —20° and about 35° C. using about 0.2 to 1% $BF_3$ on feed as catalyst. The desired resin can be obtained from the resulting polymerization product by removal of unpolymerized constituents from it, e.g., by first heating the polymerization product until a pot temperature of about 240° C. is reached and then steam distilling until a resin of the desired softening point is obtained.

The resulting light colored resin may have the following properties: specific gravity (25°/25° C.) 1.040 to 1.100, preferably about 1.070 to 1.085, heptane mixed aniline point between about 30° and 40° C., iodine number (ASTM D-555) between about 50 and 90 mgs., and an $I_2$ equivalent of $Br_2$ (D-1158) between about 35 and 50.

Examples of six resins which have a high content of cyclic structures and which are suitable for use in the present invention are described in terms of their characteristic properties in Table II.

Resins A-1, A-2 and A-3 were obtained from the same cracked feed stock (described in Tables I-A and I-B), the differences among them being due only to the extent of stripping of the polymerized product. Resins B-1, B-2 and B-3 were obtained from a somewhat different feed stock than the first three resins, the differences among them being also due only to the extent of stripping. Also described in Table II for purposes of comparison and contrast are two resins of a predominantly aliphatic type which are representative of resins heretofore used in synthetic asphalt compositions as disclosed, for instance, in U.S. Patent No. 3,070,570 to Gessler et al.

Referring to Table II, the molecular weights reported therein were determined by the osmometer method (Mechrolab instrument); the aniline points were determined by Modified ASTM D-611, using 5 g. resin, 5 ml. n-heptane and 10 ml. aniline; the solubility values ($T_1/T_2$) were determined by dissolving 5 g. of resin in 20 g. of Stoddard Solvent and gradually cooling the resulting solution, noting first the temperature ($T_1$° C.) at which the

TABLE II.—TYPICAL RESIN PROPERTIES

| Resin | Resins of Invention | | | | | | Resins of Prior Art | |
|---|---|---|---|---|---|---|---|---|
| | A-1 | A-2 | A-3 | B-1 | B-2 | B-3 | X | Y |
| R+B Soft Pt.° C. (ASTM E-28-58T) | 108 | 122 | 140 | 100 | 118 | 131 | 74 | 102 |
| Mol. Wt., no. ave | 842 | 1,049 | 1,245 | 888 | 1,069 | 1,272 | 1,100 | 1,612 |
| C/H Ratio | 10.6 | 10.8 | 10.8 | 10.0 | 9.9 | 10.8 | 8.3 | 7.5 |
| Color Neville Method | 2½+ | 2½+ | 1½+ | 3+ | 3½+ | 3½+ | 2½ | 1½ |
| Sp. Gr. (25/25° C.) | 1.087 | 1.085 | 1.072 | 1.059 | 1.064 | 1.060 | 0.972 | 0.988 |
| Refr. Index N 25/D | 1.6024 | 1.6044 | 1.6066 | 1.5901 | 1.5930 | 1.5959 | 1.5326 | 1.5370 |
| Solubility Value ($T_1/T_2$) | +2/−11 | −2/−8 | +23/+11 | +9/−44 | −12/−45 | +4/−42 | −20/−60 | −15/−60 |
| Heptane Mixed Aniline Point,° C | 34.0 | 34.8 | 37.5 | 32.9 | 32.8 | 32.9 | 97.6 | 95.6 |
| $I_2$ No. (ASTM D-555) | 67.3 | 66.1 | 51.5 | 81.0 | 78.2 | 78.2 | 147.8 | 177.0 |
| $I_2$ No. ($Br_2$, eq. (ASTM D-1158) | 43.5 | 36.7 | 29.5 | 48.6 | 49.2 | 46.9 | 69.8 | 82.9 | first cloud appears and then the temperature ($T_2°$ C.) at which a heavy cloud appears. The Stoddard Solvent used comes from paraffin base or mixed base crudes, and has a boiling range from 149° to 205° C., a maximum aromatic content of 20%, and a straight aniline point (ASTM D-1012-51) adjusted to 61.3° C. by the addition of xylene.

Referring to the data in Table II, several major differences are observable between the A and B resins on the one hand and the X and Y resins on the other hand. First, it is apparent that the resins of the invention (A and B) can be readily prepared with softening points in the range of 120° to 140° C. whereas, as U.S. Patent No. 3,070,570 indicates, in the case of resins of the X-Y type, it has not been practical to raise their softening point to values appreciably above 100° C. Second, large differences in specific gravity, in refractive index, and in C/H ratio between the A-B type of resin and the X-Y type of resin all point up the cyclic character of the former as against the open-chain, non-cyclic structure of the latter.

Third, the Solubility Values show that the A-B resins are less compatible with, or less soluble in, the relatively non-aromatic Stoddard Solvent than the X-Y resins, i.e., the A-B resins are more aromatic than the X-Y resins. This solubility test also indicates that the X-Y resins are more soluble in gasoline, which resembles the Stoddard Solvent in low aromatic character. Incidentally, the relatively small difference between the $T_1$ and $T_2$ values in the case of the particularly preferred A resins as compared with the relatively large difference between the $T_1$ and $T_2$ values in the case of the B and of the X-Y resins reflects a relatively high degree of molecular weight uniformity in the case of the A resins as contrasted with a substantially wider molecular weight distribution or the presence of a substantial amount of a relatively less soluble oxidized portion in the case of the B and of the X-Y resins. Fourth, the 60° C. higher aniline point for the X-Y resins versus the A-B resins further confirms the relatively highly aromatic character of the latter type of resin.

Fifth, the iodine numbers obtained, somewhat depending on the analytical method used, are about 2 to 3 times greater in the case of the X-Y resins than in the case of the A-B resins. This, of course, indicates superiority of the A-B resins over the X-Y resins in terms of resistance to air oxidation, sunlight and resistance to chemicals generally and consequently better durability and service life under comparable conditions.

In addition the eight resins were also tested by infrared and ultraviolet spectrographic analysis. The I.R. curves obtained show that Resins A-1, A-2, A-3, B-1, B-2 and B-3 have much greater absorbance values in the aromatic bands (6.2, 12.3, 12.8, 13.4 and 14.3 micron wavelengths) than the Resins X and Y. In comparison with the X and Y resins which have all but negligible absorption bands at 6.2, 13.4 and 14.3 microns, the A and B resins have quite substantial absorption bands in these regions; about 10 to 15 times stronger than the X and Y resins at 6.2 microns (general aromatic), and about 10 to 25 times stronger than the X and Y resins at 13.4 and 14.3 microns (indene and other mono and bicyclic benzene aromatics). Most conspicuously, the A and B resins have substantial bands at 12.3 and 12.8 microns (indicative of para and meta vinyl toluene) whereas the X and Y resins do not even show a trace of such vinyl aromatics. The I.R. curves also showed a large difference, by a factor of about 15 to 25, between the 6.8/10.3 ratios of the A and B resins on the one hand and the X and Y resins on the other hand. As all eight of the resins tested had quite similar absorbance values at 6.8 microns the relatively low 6.8/10.3 ratios in the case of the X and Y resins indicate that these are much richer than the A and B resins in trans unsaturation of the RCH=CHR' type, i.e., the X and Y resins have a considerably higher concentration of this type of reactive double bond and a correspondingly higher susceptibility to degradation by oxidation, sunlight, etc.

The ultraviolet analysis further confirmed the chemical difference between the A and B resins on the one hand and the X and Y resins on the other hand. Both the A resins and the B resins, due to the aromatic nuclei in their polymer structures, showed quite substantial absorption bands in the range between 260 and 280 millimicrons, especially at 266 or 264 millimicrons and at 273 millimicrons, whereas the X and Y resins showed a lack of absorption bands in this range. The ultraviolet analysis was performed using a Bausch & Lomb "Spectronic 505" spectrograph, a wavelength range of 210 to 360 millimicrons, cyclohexane solvent, a cell path of 1 cm., and a resin concentration of 0.05 gm./liter.

Examples of plasticizer oils suitable for use herein are shown in Table III.

TABLE III

|  | Plasticizer Oil No. 1 (Humble Flexon 391) | Plasticizer Oil No. 2 (Humble Nuso 250) | Plasticizer Oil No. 3 (Atlantic 231 Oil) | Plasticizer Oil No. 4 (Sohio Refined STJ-19) |
|---|---|---|---|---|
| Sp. Gr. at 15.6/15.6° C | .971 | .981 | .991 | .989 |
| Distillation: |  |  |  |  |
| IBP, ° C | 300 | >400 | >400 | 390 |
| 5% | 378 |  |  |  |
| 10% | 389 |  |  |  |
| 20% | 398 |  |  |  |
| 30% | 400 |  |  |  |
| Aniline Point, ° C | 45 | 51 | 57 | 13 |
| Color, Gardner | 12 | >18 | >18 | 11+ |
| Color, Neville | 2 | 11 | 8+ | 1+ |
| Flash Point, ° F | 430 | 470 | 585 |  |

For purposes of this invention, the resinous hydrocarbon binder obtained by blending the polymeric hydrocarbon resin with a suitable proportion of such a plasticizer oil should have a Ring and Ball softening point (ASTM D-36) in the range between about 40° and 70° C.

Accordingly, the binder (exclusive of any added rubber) may comprise, first, about 18 to about 75% of the aforementioned cyclic type of hydrocarbon resin obtained by polymerization of a cracked petroleum fraction boiling between about 120° and 250° C., preferably between about 150° and 220° C., and containing about 5 to 30 percent, preferably 10 to 20 percent of polymerizable cyclopentadiene hydrocarbon dimers. The resulting resin consequently contains about 10 to 35 percent of polymerized cyclopentadiene hydrocarbon units and at least about 50%, preferably about 60 to 90% of polymerized unsaturated $C_8$-$C_{10}$ aromatic hydrocarbons based on total polymer. This resin should have a number average molecular weight between about 250 to 5000, e.g., 800 to 2000; a specific gravity at 25°/25° C. between about 1.04 and 1.10, preferably between 1.06 and 1.09; a Ring and Ball softening point in the range between about 40° and 250° C., preferably between about 110° and 175° C.; an iodine number (ASTM Method between 9.5 and 11.0, and still more preferably between 50 and 70; a C/H ratio greater than about 8.5, preferably between 9.5 and 11.0, and still more preferably between 10.5 and 10.8; and a Neville Color (visual) no darker than 10, but preferably no darker than 4. Second, depending on the softening point of the polymeric resin, the binder also comprises about 25 to 82% of a plasticizer hydrocarbon oil which is liquid at 25° C., preferably has a Gardner-Holdt viscosity $Z \to Z_{10}$ at 25° C., boils predominately above 400° C., is substantially free of material boiling below 300° C., and has an aniline point between about 10° and 90° C. and a Neville Color less than 10 and preferably less than 4.

The optimum amount of oil depends on the characteristics of the hydrocarbon resin used and the characteristics of the plasticizing oil, the oil being added thereto in whatever quantity is needed to produce a binder composition of suitable properties. For instance, when a relatively soft resin having a softening point below about 70° C. is used relatively little additional plasticizer oil may be required. Conversely, with the preferred type of hard, high melting resin a relatively larger amount of oil may be used per part of resin. Thus, it is especially preferred to employ a resin having a relatively high Ring and Ball softening point, e.g., between about 110° and about 175° C., and then reduce the softening point of the hydrocarbon base composition to the desired level by including therein an appropriate amount of a suitable plasticizer oil, e.g., 1 to 4 parts of oil per part of the resin.

In addition to the resin and oil, a natural or synthetic rubber or solid diene copolymer in the raw, unvulcanized state is also preferably included in the pavement binder for best results. Indeed, it is in such rubber-containing formulations that the present invention is of greatest value since such formulations have heretofore caused the most difficulties because of premature gelation in hot storage or in transport. The rubber may be included in the novel binders in concentrations up to about 12%, preferably 3 to 8%, based on aggregate-free total binder. Rubbery styrene-butadiene copolymers of the SBR type having a combined styrene content between about 15 and 35% are particularly preferred because of their superior compatibility with the substantially cyclic resins which constitute the main components of the novel binders. However, other diene rubbers such as natural or synthetic polyisoprene or synthetic polybutadiene rubbers, as well as impact-resistant macromolecular diene copolymers of the resinous type such as butadiene-styrene resins containing more than 50% combined styrene and the increasingly available acrylonitrile-butadiene-styrene ("ABR") resins, can also be used in small amounts. The rubbers are particularly beneficial in improving the temperature susceptibility and fluidity factor of the binder with the result that they further improve the binders of this invention with respect to resistance to softening in hot weather and cracking in cold weather or under extreme loads. The rubber reduces the low temperature brittleness of the binder and improves its adhesion, ductility, resistance to weathering and hydrocarbon solvents, as well as the coefficient of friction between the paved surface and vehicle tires riding over it.

The binder composition of this invention may be made by conventional blending techniques. For instance, the hydrocarbon resin, the plasticizer oil, and SBR rubber in crumb form are mixed together and heated at a temperature of about 200° to 250° C. for a period of about 15 minutes to one hour or until complete solution, which depends on the type of mixer, the speed of mixing, etc. Instead of adding the rubber in solid form, it may be added to the other ingredients in a suitable solvent such as naphtha or xylene and the mixture then steam distilled until the volatile components are removed. Where such a steam distillation is employed a plasticizer oil which contains volatile components may be used as these components will be removed to the desired extent in the steam distillation step, wherein a pot temperature of about 250° C., for instance, may be used and vacuum may be applied if necessary. Further, instead of adding the rubbery polymer in a low boiling solvent which later must be stripped out, it is possible to add the rubbery polymer in the form of a solution in the plasticizer oil. Alternately, the rubbery polymer may be added in the form of an aqueous latex, in which case the water present is driven off during preparation of the binder blend.

The binders for pavements of this invention, which comprise a blend of the hydrocarbon resin base (resin plus plasticizer oil) and desirably also an elastomer, should have the properties shown in Table IV.

TABLE IV.—BINDER SPECIFICATIONS

| Name of Test | Broad | Preferred |
|---|---|---|
| 1. Ring-and-Ball softening point, ° C | 40-70 | 45-55 |
| 2. Penetration, ASTM D-5 (100 gms., 5 sec.) at 77° F | 40-300 | 60-100 |
| 3. Ductility (ASTM D-113) cm | >50 | >110 |
| 4. Saybolt-Furol viscosity at 275° F., secs | 75-500 | 100-300 |
| 5. Flash point, COC, ° F | >400 | >450 |
| 6. Loss on heating at 325° F. for 5 hrs., ASTM D-6, percent | 0-2 | 0-0.5 |
| 7. Penetration of residue after loss on heating test, as percent of original ASTM D-5 | 75-100 | 85-100 |

To make up a paving composition, a binder having the above properties may be mixed with mineral aggregate in any suitable manner, for instance, using substantially the same kind of equipment and the same procedures, including the same mixing temperatures, as are conventionally used in the cases of paving compositions based on black petroleum asphalt. Thus, the binder may be made fluid and pumpable by heating it above its softening point whereupon it is transferred to a pug mill and there mixed with suitably preheated and dried aggregate, e.g., at a temperature between about 125° and 165° C., until a uniform paving mixture is obtained. The aggregate is preferably supplied to the pug mill from a drier having an outlet temperature of about 175° to 190° C. so that the aggregate would reach the pug mill at a temperature between about 135° to 170° C. Of course, the optimum preheat temperature of the aggregate depends somewhat on the temperature at which the binder is charged to the pug mill, the heat losses incurred in the mixing step and the desired mixing temperature. When, unlike in the conventional asphalt art, the binder of this invention is actually formed in the pug mill by charging to it solid flaked resin and normally fluid oil as separate components at ambient temperature without any preheat, the aggregate alone must supply all the heat required for proper mixing and must therefore be preheated to a suitably higher temperature than when a preblended and preheated binder is used. As stated earlier herein good paving compositions are obtained by mixing about 4 to 15 parts of binder per 100 parts of mineral aggregate.

When it is desired to use the present invention for making colored pavements, for instance, for paving driveways or service areas in gasoline stations, or for color coding of complex highway interchanges by means of appropriately colored dividing strips, any light, heat and weather stable non-bleeding pigment or combination of pigments may be used. Thus, suitable pigments include titanium dioxide, phthalocyanine green, phthalocyanine blue, iron oxide red, molybdate orange, chrome yellow, etc. Where merely a paving surface of good light reflecting properties is desired, satisfactory results can be obtained by combining the binder with a suitable light colored stone aggregate, without the addition of any pigment or with the addition of a white pigment such as titanium dioxide.

Example 1

The present invention is further illustrated by the following working example showing one embodiment of this invention.

45 volumes of a cracked feed stock having the composition and properties described above in Tables I-A and I-B is diluted with 55 volumes of xylene to give a blend with about 41% polymerizables. This blend, precooled to −10° C., is fed at a rate of 15 gallons per minute into a jacketed pipe serving as a continuous polymerization reactor, BF$_3$ gas being injected at the rate of 0.3% on the blend. The maximum reactor temperature near the outlet end is 60° C., but most of the polymerization process takes place at temperatures below 30° C. The resulting polymerized oil is then neutralized at 50° to 55° C. by mixing with a 50/50 mixture of clay and lime and undissolved solids are separated from the neutralized oil by filtration.

Next a 12.5% solution of SBR crumb rubber ("Ameripol 1006") in xylene is made up, and a blend of polymerized oil, rubber solution and Plasticizer Oil No. 1 (see Table III) is prepared as follows:

| | Parts |
|---|---|
| Polymerized oil | 27.6 |
| Plasticizer oil No. 1 | 67.1 |
| Rubber solution | 42.4 |

This blend is steam distilled under vacuum at 245° C. until a finished binder having the following properties is obtained:

| | General | Typical |
|---|---|---|
| R & B Soft point, ° C | 44–47 | 45 |
| Penetration ASTM D-5 100 g., 5 secs. 25° C. 1/100 cm | 80–100 | 90 |
| Color, Neville (visual) | 4 Max. | 2 |
| Flash Point, COC, ° C | >200 | >230 |
| Saybolt-Furol visc. at 135° C., seconds | 75–200 | 94 to 101 |

The distillate recovered from this steam stripping step, or any similar solvent, may be used instead of xylene to dilute the feed in subsequent polymerization runs.

Seven parts of the binder described above is finally mixed with 93 parts of preheated mineral aggregate which may include proper proportion of a suitable pigment in a pug mill at a mixing temperature between 125° and 150° C., and the resulting mix is spread on a roadbed and compacted at a temperature between about 65° and 85° C. An excellent light colored pavement is thus obtained.

The binder of this invention can be stored as a liquid at elevated temperatures, e.g., between 135° and 150° C., without undergoing any great or objectionable change. By contrast, synthetic binders which are too reactive (such as those prepared from dripolene streams which are obtained by thermal cracking of natural gas or low boiling liquid petroleum cuts and which usually contain more than 40% of cyclopentadiene dimer and codimers unless specially processed to reduce the concentration of these compounds therein) have poor storage stability at elevated temperatures in that they gradually become converted to a solid gel. To illustrate this, the binder described above in this example was compared with another binder initially having quite similar properties but based on a resin obtained by the polymerization of a dripolene stream containing 50% dicyclopentadiene. Both were stored for 21 days at 150° C. under identical conditions and the viscosities of each binder were measured before and after storage. The results are summarized below:

| Resin Type in Binder | Viscosity of Binder Before Storage | Saybolt-Furol at 135° C., secs. After Storage |
|---|---|---|
| Resin of invention | 101 | 119 |
| Dripolene resin (high cyclodiene content) | 303 | ¹ 2,000 |

¹ Gelling.

As can be seen from these viscosity data, the binder of the invention underwent hardly any change at all after three weeks' storage at 150° C. whereas the other binder began to gel, due to excessive cross-linkage of the cyclodiene structures present.

On the other hand, a certain limited amount of cyclodiene structures in the binder resin as described earlier herein is beneficial in that it contributes to a desirable balance between the initial softening point of the binder and its ultimate curing and ageing properties in service.

The excellent hot storage stability of the binder of the present invention is also evident from a comparison of its behavior under hot storage conditions with the behavior of typical black petroleum asphalt binders. In this test the binder samples were stored for 12½ weeks at 130° C.

| Binder Type | Viscosity of Binder Before Storage | (Saybolt-Furol at 135° C., secs.) After Storage |
|---|---|---|
| Binder of invention | 100 | 215 |
| Black asphalt, Sample C | 177 | 2,050 |
| Black asphalt, Sample D | 141 | 750 |

The above data show that the binder of the present invention thickens only slightly when kept at an elevated temperature over prolonged periods. In fact, its viscosity change under these conditions is substantially less pronounced than the viscosity change shown by typical commercial black asphalt samples under the same conditions.

Example 2

A comparison of the binder of the present invention with a recently introduced commercial paving Binder H based on the teachings of U.S. Patent No. 3,070,570, and with typical samples of conventional black asphalt, in terms of their respective workability and viscosity characteristics, is summarized in Table V. This table shows the penetration value at room temperature and viscosities at several elevated temperatures for each binder.

TABLE V.—COMPARATIVE WORKABILITY OF VARIOUS BINDERS

| Binder Sample | Penetration 100 gms., 5 sec. at 25° C. | Saybolt Furol-Viscosity in seconds at— | | | | | | Optimum Mixing Temp., ° C. |
|---|---|---|---|---|---|---|---|---|
| | | 125° C. | 135° C. | 150° C. | 163° C. | 190° C. | 220° C. | |
| Binder of invention | 82 | | 94 | | 34 | | | 125–150 |
| Asphalt Sample C | 87 | | 283 | | 85 | | | 150–165 |
| Venezuelan asphalt | 88 | 255 | | 84 | | | | 140–155 |
| California asphalt | 97 | 150 | 89 | 74 | | | | 125–140 |
| Synthetic binder H | 11 | | | | | 373 | 161 | 79 | 190–220 |

The optimum mixing temperature of an asphalt-like paving mix is a function of the viscosity of the binder. It is generally accepted in the trade that for mixing applications, the specified temperature will be such that the asphalt viscosity is within the range of 75–150 seconds, Saybolt-Furol. In determining the optimum mixing temperature for each of the binders tested, the viscosity readings obtained at various temperatures have accordingly been plotted and the temperature range at which the viscosity is between 75 and 150 seconds has been shown in Table V. Optimum temperature for application, raking and rolling of a pavement using a particular binder is also a function of viscosity. For instance, the optimum compaction temperature for the preferred paving compositions of the present invention is between 65° and 85° C. whereas for the Binder H a compaction temperature of 120° C. is recommended by its manufacturer.

It can be seen from the data in Table V that the optimum mixing temperature of the three conventional asphalts is in the range from 125° to 165° C., and that the optimum temperature of the synthetic binder of this invention is also within this customary range. By contrast, the Binder H has an optimum mixing temperature between 190° and 220° C., well above the conventional range. Such high mixing temperatures are undesirable because they create a fire hazard and tend to cause warpage and increase maintenance of the drying and mixing equipment. The higher temperatures required for proper workability further tend to result in problems of application and may require complete abandonment of whole batches of material if any unforseen delays occur at or in transit to the work site.

Example 3

Instead of making up a paving mixture by mixing aggregate with a preblended, asphalt-like, relatively low melting binder of the desired characteristics, the present invention makes it possible and convenient to supply the binder in the form of two separate, easily handled components, namely, (1) a flaked, relatively high melting solid and (2) a liquid plasticizer oil. In such a case the flaked solid shall be a blend of the synthetic polymeric cylic resin, rubber and only a portion of the total plasticizer oil required, while the remainder of the plasticizer is supplied directly to the mixing stage in liquid form.

As in the other embodiments described earlier herein, the plasticizer oil shall of course again be a non-volatile high boiling hydrocarbon compatible with the solid cyclic resin. The flaked solid and the plasticizer oil shall be used in such proportions to give a blended binder having the desired penetration. In this embodiment both the solid and the liquid components may be readily charged cold, in preweighed packages or units, to the hot mineral aggregate in a pug mill, the aggregate having been preheated to a sufficient temperature to cause melting of the flaked solid and thus assure proper blending. This then enables the asphalt plant operator or paving contractor to use the novel paving composition without the necessity of having special hot storage tanks, pumps, lines and weigh buckets. Thus, for instance, for one ton of mix the operator has only to add one easy to handle preweighed unit of each component to the aggregate in the pug mill.

To make the flaked solid required in this embodiment the same kinds of materials are used as in the preblended binder described earlier herein, but they are combined in different proportions. An example of such a blend is as follows:

| | Parts |
|---|---|
| Polymerized oil (as in Example 1) | 77.0 |
| Plasticizer oil No. 1 (as in Example 1) | 14.7 |
| Rubber solution (as in Example 1) | 66.4 |

This blend is steam distilled under vacuum at 245° C. until the desired properties are reached, and then flaked in an otherwise conventional manner. The finished product should have the following properties:

| | |
|---|---|
| R & B softening point, ° C. | 113–117 |
| Neville color, max. | 4 |
| Flash point, COC, ° C. | >200 |
| Gardner visc. 70% sol. in tol. at 25° C. | $Z_1$–$Z_2$ |

In a separate operation, Plasticizer Oil No. 1 is steam distilled under vacuum at 220° C. until the desired conditions are reached, e.g., until 25% of the light ends of the oil are removed. The resulting oil should preferably meet the following specifications:

| | |
|---|---|
| Gardner color, max. | 18 |
| Flash point, COC, ° C. | >230 |
| Gardner visc. 70% sol. in tol. at 25° C. | $Z_1$–$Z_2$ |

The flaked solid and the fluid oil are then packaged in 67 and 73 pound containers, respectively; and when combined in these proportions, produce a binder with a 80 to 100 penetration, in the proper quantity for mixing with one ton of mineral aggregate.

Of course, it will be obvious to those skilled in the paving and construction art that the present invention and various modifications thereof may be used in a wide variety of ways other than in paving road surfaces. For example, it may be used in the construction of light or brightly colored curbing, traffic islands, medial strips, paving blocks for sidewalk pavement, and various shaped and sized pieces for mastic tile, etc.

It will be understood that amounts and proportions of materials are expressed throughout this specification on a weight basis unless otherwise indicated.

The invention is particularly pointed out in the appended claims.

What is claimed is:
1. A process for making a hot mix asphaltic concrete which comprises:
  (i) heating mineral aggregate to a temperature in the range between about 135° and 170° C.;
  (ii) adding to said heated aggregate in a mixing zone a synthetic binder composition in the form of solid flakes, said binder composition being characterized by improved storage stability and a softening point (ASTM D–36) of between about 100° and 120° C., and comprising (1) a light-colored thermoplastic polymeric hydrocarbon resin substantially free of components boiling below 400° C., having a specific gravity at 25°/25° C. between about 1.040 and about 1.100, a number average molecular weight between about 250 and about 5000, an iodine number between about 40 and 90 mgs., and a Ring and Ball softening point between about 100° and about 250° C., said resin comprising between about 10 and about 35% polymerized cyclopentadiene units and at least about 50% polymerized unsaturated $C_8$–$C_{10}$ aromatic hydrocarbons based on total resin as the principal polymeric constituents thereof, and (2) a high boiling substantially inert mineral oil which has a straight aniline point not in excess of about 60 and is compatible with said resin, said oil being present in the flaked binder composition in an amount as necessary to impart thereto the desired softening point;
  (iii) further adding an amount of high boiling substantially inert mineral oil in liquid form to said heated aggregate in said mixing zone, which oil is compatible with said flaked composition; said flaked solid composition and oil in liquid form being added to the mixing zone (a) in relative amounts such as to produce a mixed binder having a softening point between about 40° and 70° C. and a penetration (at 25° C., 100 gm., 5 sec.) of not more than about 300 and (b) in a total amount such as to provide 4 to 15 parts of binder per 100 parts of aggregate; and
  (iv) mixing said aggregate, said flaked composition and said oil at a temperature between about 150° and 175° C. until a uniform concrete mix is produced.
2. A process according to claim 1 wherein said flaked binder composition also comprises 3 to 8% of a diene rubber based on total binder.
3. A process according to claim 1 wherein the mixed binder has a Saybolt-Furol viscosity at 135° C. of at least 75 and not more than 200 seconds.
4. A process according to claim 2 wherein the mixed binder has a Saybolt-Furol viscosity at 135° C. of at least 75 and not more than 200 seconds and a penetration of between 80 and 100.

References Cited

UNITED STATES PATENTS

| 3,297,625 | 1/1967 | Regenstein | 260—82 |
| 2,582,425 | 1/1952 | Geiser | 260—82 |
| 2,856,389 | 10/1958 | Fusco et al. | 260—82 |
| 3,070,570 | 12/1962 | Gessler et al. | 260—41.5 |
| 3,316,203 | 4/1967 | Dereich et al. | 260—33.6 |

MORRIS LIEBMAN, *Primary Examiner.*

J. H. DERRINGTON, *Assistant Examiner.*

U.S. Cl. X.R.

260—41.5, 82, 892, 5